3,666,335
HEAVY-DUTY RESILIENT ELASTOMERIC BUSHING
Arthur Mundy, Lucerne, and David L. Sievers, Logansport, Ind., assignors to The General Tire & Rubber Company, Akron, Ohio
Filed Aug. 10, 1970, Ser. No. 62,464
Int. Cl. F16c *33/22, 27/06;* F16f *1/38*
U.S. Cl. 308—238                                9 Claims

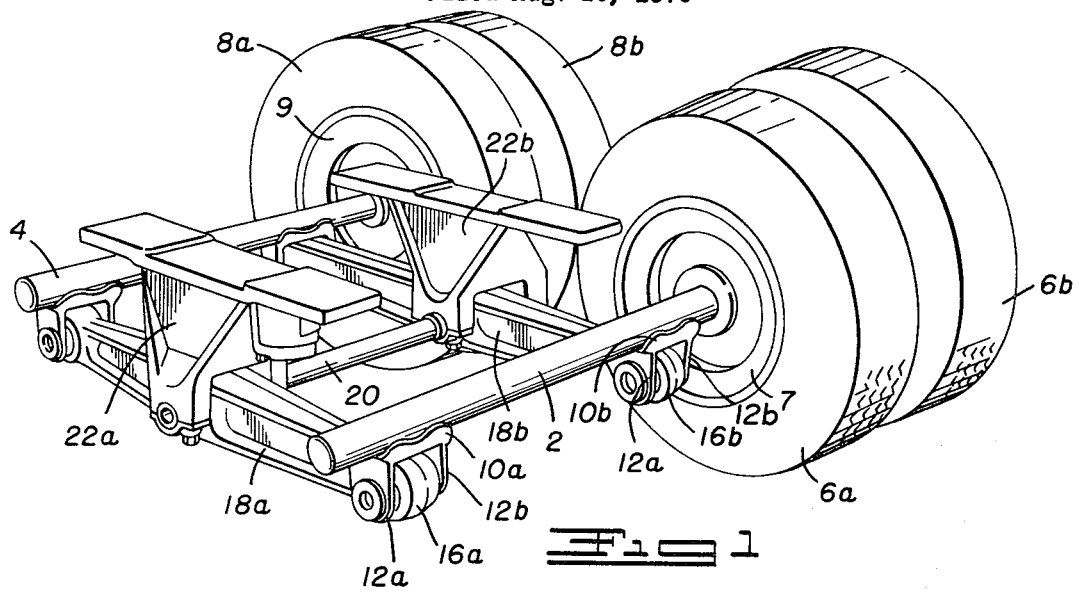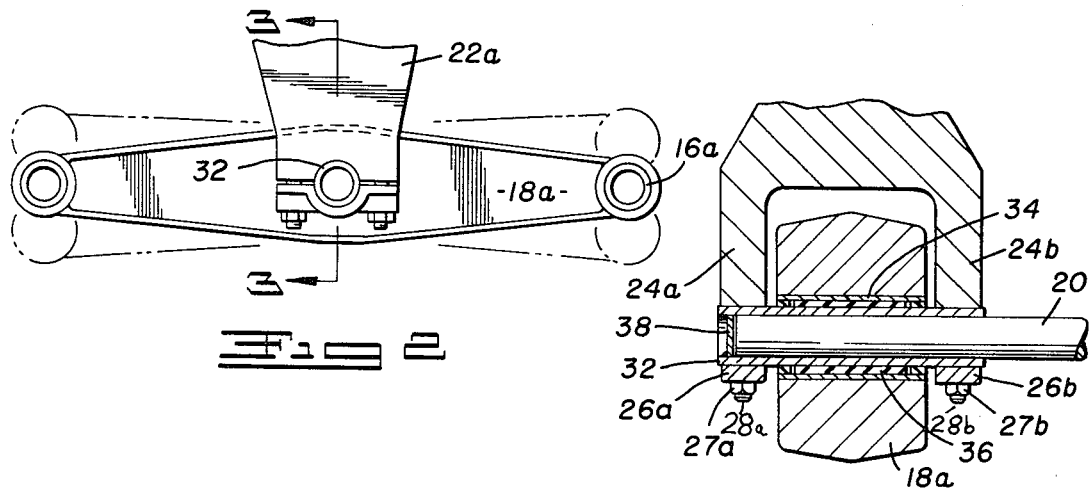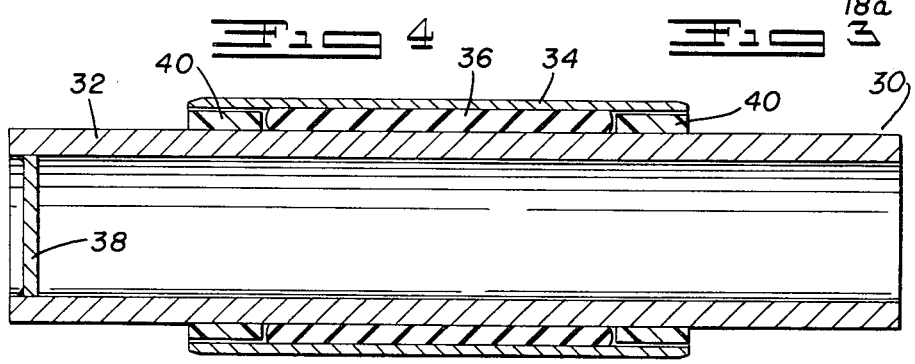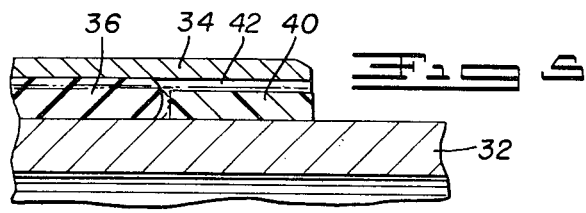
INVENTORS
DAVID L. SIEVERS
ARTHUR MUNDY
BY James A. Lucas
ATTORNEY

United States Patent Office 3,666,335
Patented May 30, 1972

ABSTRACT OF THE DISCLOSURE

A resilient bushing of the type comprising an annular molded rubber insert radially compressed between a pair of rigid concentric sleeves is used in the center eye of a beam for a tandem axle of a truck or elsewhere where the bushing is subjected to torsional and radial deflection as well as conical motion. The conical motion causes the ends of the outer sleeve to rub and abrade the rubber insert, resulting in premature failure of the bushing. The fatigue life of the bushing can be substantially increased by replacing a portion of the insert, at each end of the bushing, with a wear-resistant ring made from a material such as cast urethane. The two rings typically grip the inner sleeve and are sufficiently thin so that the outer sleeve does not contact them when the bushing is loaded statically in the radial direction. However, they are thick enough to limit the conical movement of the sleeves.

BACKGROUND OF THE INVENTION

The invention relates to a resilient bushing of the type commonly referred to as a silentbloc bushing, comprising two concentric rigid sleeves separated by a molded and cured resilient elastomeric insert. The inner sleeve is typically circular and may be either solid or hollow while the outer sleeve is normally circular or oval. The rubber insert is constrained between the two sleeves under high radial compression, and permits the two sleeves to move torsionally, radially and axially with respect to one another. The compression of the rubber between the sleeves prevents slipping between the rubber and the sleeves. If the bushing is to be used under severe load conditions, the rubber is often adhesively bonded to one or both sleeves to further increase the resistance to slipping.

There are many uses for these bushings. They may be used in nearly any application where two component parts of an apparatus must be interconnected, yet vibrationally isolated. In a vehicle, these bushings are used in the eye of the leaf springs and at other locations in the suspension system, as engine or transmission mounts and in steering and idler arm assemblies. In a tandem axle unit of a truck wherein one axle is joined to each end of a beam, the beam is pivotally joined at its center to a saddle through a resilient bushing of the aforedescribed type, called a center beam bushing. The body of the truck is normally secured to the saddle. The weight of the truck body and its load on the resilient bushing causes the bushing to deflect radially while the bouncing of the wheels independently of one another causes the beam to oscillate whereby the bushing deflects in a torsional mode. In addition, it has been found that this bushing undergoes a substantial amount of conical deflection resulting in angular misalignment of the two sleeves of the bushing. It has been found that this conical deflection produces severe scrubbing of the insert between the sleeves, often leading to premature failure of the bushing.

BRIEF DESCRIPTION OF THE INVENTION

It is an object of the present invention to improve the fatigue life of the center beam bushing used in a tandem axle suspension.

Another object of the invention is to use uncompressed abrasion resistant rings as a replacement for a portion of the rubber insert at either end of the insert to improve the wear resistance of a resilient bushing.

Yet, another object is a bushing comprising a pair of concentric, spaced apart, rigid sleeves one inside the other, and an elastomeric insert radially compressed and occupying between about 70 and 90% of the space therebetween, and an abrasion resistant sleeve at either end of the insert, between the two sleeves in contact with one of the sleeves and normally spaced a distance from the other sleeve at least equal to the amount that the bushing deflects radially when subjected to normal static loading.

BRIEF DESCRIPTION OF THE DRAWINGS

These and other objects are achieved in the manner to be hereinafter described with particular reference to the drawings in which:

FIG. 1 is a perspective view of a truck tandem axle unit showing the various component parts thereof;

FIG. 2 is a view of an equalizer beam of the axle unit of FIG. 1;

FIG. 3 is a cross-sectional view taken along lines 3—3 of FIG. 2;

FIG. 4 is a cross-sectional view of the bushing shown in FIG. 3; and

FIG. 5 is an enlarged view of one end of the bushing of FIG. 4.

DETAILED DESCRIPTION OF THE INVENTION

FIG. 1 shows a tandem axle unit comprising a pair of axles, 2, 4 each joined to two sets of dual tires 6a, 6b and 8a, 8b mounted on rims 7 and 9. Axle 2 is secured to two brackets 10a, 10b each having a pair of depending arms 12a, 12b. Bracket 10a is joined through bushing 16a to one end of equalizer beam 18a and in like manner, bracket 10b is connected to equalizer beam 18b by bushing 16b. The two bushings 16a, 16b are held within the respective brackets by pins, bolts or other suitable means. Axle 4 is connected to the other end of the two equalizer beams 18a, 18b in the same manner. The two beams 18a, 18b are joined at their center by a cross tube 20 which serves to maintain alignment of the tandem axle unit. A pair of saddles 22a, 22b are connected to the beams 18a and 18b and a truck body is supported on top of the two saddles. Suitable load cushioning devices (not shown) are typically used between the saddle and the truck body.

FIGS. 2 and 3 show equalizer beam 18a mounted in saddle 22a in a manner that permits the beam to pivot as each axle passes over a bump or obstacle in the road. The beam serves to equalize the distribution of the truck load between the two axles thereby minimizing the amplitude of jolts and bounces as the truck passes over a bump. In this type of suspension, the vertical movement of the saddle 22a and the resultant movement of the truck body attached thereto is equal to one half of the vertical movement of a set of dual wheels passing over a bump. A resilient bushing 16a is press fitted or otherwise inserted in the eye at each end of the beam.

The saddle 22a is joined to the beam 18a through a resilient bushing 30 comprising a pair of metal sleeves separated by a rubber insert. The details of the assembly are shown in FIG. 3. The saddle contains two downwardly depending arms 24a, 24b. The bushing 30 comprises an inner sleeve called a beam center sleeve 32 and an outer sleeve 34, separated from one another by a resilient elastomeric insert 36. The inner sleeve is secured between the two arms 24a, 24b of the saddle by clamps 26a, 26b bolted to the arms by nuts 27a, 27b threaded onto studs 28a, 28b. The cross tube 20 extends into the beam center sleeve 32 and contacts a plug 38 or other suitable stop welded or otherwise immovably positioned within sleeve 32. The outer sleeve 34 is press fitted or otherwise held in an annulus in the center of the equalizer beam 18a. Pivotal movement of the equalizer beam 18a with respect to the saddle 22a results in torsional deformation of the insert 36 within the bushing.

FIG. 4 shows the details of the bushing of the present invention. As previously mentioned, the bushing is composed of an inner sleeve 32 referred to as a beam center sleeve and an outer sleeve 34, with a suitable annular rubber insert 36 radially compressed therebetween. The insert 36 is generally molded from a rubber compound formulated so as to have good properties of recovery, hardness and resistance to dirt, gasoline and the like. If the rubber is too stiff or hard, torsional loading of the bushing may cause the rubber to slip with respect to either of the two sleeves, or may limit the ability of the two axles to comply with undulations and bumps in the road. A hardness of about 72 to 78 Durometer has been found to be particularly suitable. The insert is typically molded in a compression mold and is vulcanized at elevated temperatures using a suitable curing agent. The thickness of the annular insert as molded is between 1½ and 2 times the distance between two sleeves while the insert is about ½ as long as the length of the outer sleeve. When the bushing is assembled, the insert is compressed radially, causing it to elongate and fill at least 70% to 90% of the annular space between the inner and outer sleeves.

In accordance with the present invention, a hard, wear resistant ring 40 is slipped over each end of the inner sleeve 32 to fill the remaining annular space between the sleeves. The rubber insert 36 is preferably centered axially with respect to the outer sleeve 34, in which case the two rings are identical in size. The outer diameter of each ring 40 is slightly less than the inner diameter of the outer sleeve 34 thereby providing clearance to allow for static radial deflection of the two sleeves 32, 34 without compression of either ring 40. If this clearance is too small or too great, the benefits of the invention will not be fully realized. Typically, this clearance should be less than .010" when the bushing is statically loaded in the radial direction.

The enlarged end view of FIG. 5 shows one of the wear resistant rings 40 located radially beneath one end of outer sleeve 34 and hugging the inner sleeve 32. The ring is spaced from the rubber insert 36 a sufficient distance to permit the insert to deflect and bulge in compression. A space 42 is provided between the ring and the outer sleeve. This space is sufficient to permit the outer sleeve to deflect toward the inner sleeve 32 as shown in outline when subjected to a static radial load. As noted, this deflection compresses the rubber insert and causes it to bulge. It does not, however, normally cause the outer sleeve to contact the ring.

The following examples are presented to further illustrate the present invention. A bushing, corresponding to one used in the center of an equalizer beam in a tandem axle unit is composed of a tubular inner sleeve, having a length of 12½" and an outer diameter of 2¾", surrounded by an outer sleeve having an inner diameter of 3⅜" and a length of 7". When the two sleeves are concentric, the radial space between them is about .312". Several elastomeric inserts were molded from a rubber formulation of 100 parts of natural rubber, compounded with 67 parts of carbon black along with suitable plasticizers, antiozonants and a sulfur curing system. The inserts were formed by compression molding and were thereafter cured in a hot air oven at a temperature of about 300° F. for 20 to 22 minutes. The completed inserts had a Shore A durometer hardness of about 75 and had the following approximate dimensions in inches:

| | |
|---|---|
| Inner diameter | 2.44 |
| Outer diameter | 3.68 |
| Axial length | 2.80 |

The bushings were assembled in the following manner: The insert was funneled into the outer sleeve to form a subassembly which was then shot or forced over the inner metal using a tapered mandrel. A suitable oil was used to lubricate the parts during assembly. The extremely high radial compression caused the insert to elongate about 100% and served to prevent slipping between the insert and the sleeves. No chemical bond was used between the rubber and the sleeves. A urethane ring was then slipped onto each end of the inner sleeve. These rings were molded from a liquid polymeric mixture of 1,4 oxybutylene glycol and toluene diisocyanate which has about 3.65% of available isocyanate. This polymer is sold by Du Pont under the trade name Adiprene L–167. The polymer was cured with 20 parts MOCA, an aromatic diamine consisting of 4,4' methylene-bis (2-chloroanilene). This curing agent gives a fast cure along with substantial chain extension and cross linkage to produce a tough polymer having a hardness of about 95 Durometer (Shore A). One set of rings was cured for 15 minutes in a mold at 212° F. followed by a three hour post cure at 212° F. A second set was cured for 30 minutes in the molde at 212° F. followed by the same post-cure and a third set (Sample C) was cured for 30 minutes in the mold followed by a room temperature post cure for at least 14 days. All of these rings were ¾" wide and had an inner diameter that was aboult 0.015" smaller than the outer diameter of the inner sleeve. When assembled onto the bushing, the rings were spaced between about .010" and .020" in the radial direction from the outer sleeve. Because of high compression, elongation, and hardness of the rubber insert, the bushing had an extremely high radial static spring rate and deflected only about 0.010" under a radial load of about 10,000 pounds. Thus the clearance between the ring and the outer sleeve was ample to prevent pressure contact between the sleeve and the ring under conditions of static loads.

The three bushings were mounted in a test machine comprising a beam similar in appearance to the equalizer beam shown in FIG. 2. The ends of the beam were oscillated in an axial direction to subject the bushing to severe conical load under a torque of about 14,000 foot-pounds. The three bushings were run for periods of 31 to 48 hours without failure.

These bushings were compared with several unimproved bushings in which the rubber insert occupied the entire space between the two sleeves. When run under the same conditions, these bushings had an average life of about 6.8 hours, varying between about 4.2 and about 10.9 hours before failure of the rubber.

Many factors are to be considered in the selection of end rings having the proper dimensions. Among these factors are the size of the bushing including the thickness of the insert, the hardness of the rubber and the amount of elongation of the insert in the assembly, as well as the radial torsional and conical loads to be sustained. The rings should preferably hug the inner sleeve and be spaced from the outer sleeve a distance at least equal to the static radial deflection of the bushing. For example, in a very stiff bushing having a static spring rate of 1,000,000 pounds per inch, the spacing between the ring and the outer sleeve should be about .001" for each 1,000 pounds of anticipated static load. For softer spring rates, i.e. where softer or lower durometer rubber is used for the insert, the spacing is correspondingly greater. Instead of hugging or gripping the inner sleeve, the ring may be press fitted or cemented onto the outer sleeve, and spaced from the inner sleeve a like amount. If the clearance is too great, the bushing is subjected to an excessive amount of conical motion in use and the wear resistant ring does not appreciably increase the life of the bushing. Accordingly, the clearance should not exceed about 2.0 times the space needed to accommodate the static load. The rings then serve to limit the amount of allowable conical deflection.

The width of the ring is also important in that it determines the width of the rubber that will be available for carrying out the normal functions of the bushing. The use of a wide ring with a corresponding reduction in the width of the rubber insert results in a reduction in the various spring rates of the bushing and a diminution of the advantages of using a rubber insert. Where it is desired to maintain high spring rates or a high slip angle, this is an obvious drawback. Normally the combined width of the two rings should not exceed 30% of the total width of the area of confinement. In order for the rings to be effective, their combined width should be at least about 5%. A desirable range is a combined length of between about 10% and 20% of the axial length of confinement between the two sleeves.

Although the invention has been described with respect to urethane rings, other types of rings can also be used. For example, nylon, steel, bronze or other abrasion resistant materials may be used at the ends of the rubber insert to prevent scrubbing and degradation of the rubber by the conical motion of the two sleeves. Other variations can be made without departing from the scope of the invention which is delimited by the claims wherein we claim:

1. A resilient bushing comprising a molded elastomeric insert and a pair of rigid annular sleeves comprising an inner-sleeve and an outer-sleeve substantially shorter than said inner-sleeve, said insert radially compressed between the sleeves and elongated as a result of the compression an amount of at least about 50% of its length, said insert centered with respect to the outer-sleeve and having an assembled length of between about 70% and 95% of the length of the outer sleeve, said bushing improved by the inclusion of a wear resistant ring axially adjacent to and spaced a predetermined distance from each end of the insert, each of said rings disposed around and in contact with the inner-sleeve and beneath and spaced from the end portions of said outer-sleeve an amount that is no greater than about 2.0 times the distance that the inner and outer-sleeves deflect toward one another under normal static radial load.

2. The bushing according to claim 1 wherein each wear resistant ring is composed of a tough polymeric material.

3. The bushing according to claim 2 wherein the polymeric material comprises cast polyurethane.

4. The bushing according to claim 3 wherein the polyurethane has a hardness of about 95 Durometer (Shore A).

5. The bushing according to claim 1 wherein the combined width of the rings is between about 5 and about 30% of the axial length of the outer sleeve.

6. The bushing according to claim 5 wherein the combined width is between about 10 and about 20% of the length of the outer sleeve.

7. A bushing for the center eye of an equalizer beam of a tandom axle unit wherein the bushing is composed of a molded and cured rubber insert radially compressed between an inner-sleeve and an outer-sleeve that is shorter than the inner-sleeve, wherein said bushing is subjected to radial, torsional, and conical loads, with the insert serving to restrict radial and torsional movement, said bushing improved by the incorporation of a wear resistant ring adjacent to and spaced a predetermined distance from each end of the insert to restrict the conical movement, the rings located beneath the ends of the outer-sleeve and spaced from one of said outer or inner-sleeves a distance at least equal to the amount of normal radial static deflection of the bushing under load but not greater than about 2.0 times that distance.

8. The bushing according to claim 7 wherein the width of the ring is between about 5% and 10% of the total width of the outer sleeve.

9. The bushing according to claim 7 wherein the ring is molded from a polyether based polyurethane elastomer.

References Cited
UNITED STATES PATENTS

| | | | |
|---|---|---|---|
| 3,118,710 | 1/1964 | Hamel | 308—26 X |
| 3,458,214 | 7/1969 | West | 308—238 X |
| 2,140,038 | 12/1938 | Watts | 308—26 X |

FOREIGN PATENTS

| | | | |
|---|---|---|---|
| 1,257,429 | 2/1961 | France | 308—26 |

MARTIN P. SCHWADRON, Primary Examiner

B. GROSSMAN, Assistant Examiner

U.S. Cl. X.R.

308—26